United States Patent [19]

McNabney et al.

[11] 3,734,846

[45] May 22, 1973

[54] PROCESS FOR PRODUCING OZONE USING A FLUIDIZED BED DIELECTRIC

[75] Inventors: Ralph McNabney, Morristown, N.J.; Derk Th. A. Huibers, Naarden, Netherlands

[73] Assignee: Airco Inc., New York, N.Y.

[22] Filed: July 1, 1971

[21] Appl. No.: 159,047

Related U.S. Application Data

[62] Division of Ser. No. 878,494, Nov. 20, 1969, Pat. No. 3,654,126.

[52] U.S. Cl.................................204/176, 204/322
[51] Int. Cl.........................C01b 13/10, C01b 13/12
[58] Field of Search......................204/176, 313, 322

[56] References Cited

UNITED STATES PATENTS

| | | | |
|---|---|---|---|
| 886,874 | 5/1908 | Schneller | 204/322 |
| 1,403,759 | 1/1922 | Fitzpatrick | 204/322 |
| 1,461,238 | 7/1923 | Willson | 204/322 |

*Primary Examiner*—John H. Mack
*Assistant Examiner*—T. Tufariello
*Attorney*—H. Hume Mathews and Edmund W. Bopp

[57] ABSTRACT

Apparatus and method are disclosed for high efficiency electrical conversion of oxygen to ozone. An oxygen-containing gas is passed upwardly through a particulate dielectric contained between spaced electrode surfaces, whereby a fluidized bed is established consisting of a suspension of said dielectric particles in the streaming gas. Means are present for simultaneously maintaining a silent electrical discharge across the spaced electrodes and through the fluidized bed. The bed acts as a highly effective heat sink and also promotes the presence of high-frequency components in the current waves passing between electrodes, as a result of which increased electrical efficiency and increased ozone output is enabled in the conversion process.

4 Claims, 2 Drawing Figures

Patented May 22, 1973  3,734,846

PROCESS FOR PRODUCING OZONE USING A FLUIDIZED BED DIELECTRIC

This is a division of copending application Ser. No. 878,494, filed Nov. 20, 1969, for FLUIDIZED BED OZONE GENERATOR, now U.S. Pat. No. 3,654,126.

BACKGROUND OF THE INVENTION

1. Field of the Invention

This invention relates generally to methodology and apparatus useful in ozone generation; and more specifically relates to methodology and apparatus wherein oxygen is converted to ozone through use of silent electrical discharges.

2. Description of the Prior Art

Large scale generation of ozone has become within recent years a subject of ever-increasing interest. Not only has use of this powerful oxidizing agent been augmented in the burgeoning chemical industries, but moreover large quantities of the substance are now being demanded for use in environmental engineering application. The increasing water and air pollution present in our urbanized centers, for example, may be partially alleviated by ozone treatment of waste effluents and by direct ozonization of environmental air and waters. Such treatment enables one to not only purify these substances and thereby recover the original natural environment, but moreover enables such result without introduction into the environment of esthetically undesirable agents. Water, for example, when purified with ozone, is not only rendered safe for human consumption, but is actually improved in its esthetic properties such as taste and odor — a result which is in marked contrast to that yielded by treatment of drinking waters with chlorine or similar germicidal agents.

While various chemical techniques are known for producing on a laboratory scale quantities of ozone, it is generally recognized in the art that electrical energy is by far the most suitable medium for actual industrial production of the substance. For purposes of such large scale ozone generation, preference is given to the so-called "silent electrical discharge" method. Ozone generators operating on this principle generally consist of two electrodes (or a plurality of such electrode sets), one of which is covered with a dielectric plate, and a discharge space. The electrodes are connected to an a.c. potential of some 7 to 20 KV, which produces an electric current accompanied by a pale bluish-violet light in the discharge space therebetween. Oxygen or a gas mixed with oxygen is caused to flow under regulated pressure through the discharge space, whereat collision with impinging electrons provides the energy necessary for ozone formation. The dielectric plate — glass or the like — acts to distribute and stabilize the discharge, thereby preventing sparking or the like.

Ozone production in devices of the type above-described is known to be a function of several variables, including the flow rates of the throughput gases, the magnitude and frequency of the voltage present between plates, and the pressure temperature and composition of the gas. Under the heading of frequency of operating voltage it may also be observed that it is known that ozone production is an increasing function not only of the fundamental frequency of the applied voltage, but also is found to increase as a function of such superimposed high frequency components as are present in the current waves.

While proper adjustment of the above parameters can yield optimum ozone production for given situations and equipment, it is unfortunately true that the electrical efficiency of the aforesaid ozone generators is very low. As power cost is one of the major expenses in ozone production, this fact is of enormous significance. Typically the utilization efficiency of the power input is only about 10 percent; the other 90 percent of the energy is converted to heat, which decomposes ozone and lowers the efficiency. Reduction of this destructive heating would effect a major improvement.

In ozone generators operating on the silent discharge principle, it has been common to partially alleviate the heating problem described in the foregoing paragraph, by providing water cooling for the grounded electrode member of the electrode pair. Such a cooling arrangement, however, is of only limited utility: firstly because it only provides cooling at a surface — and not within the discharge space proper; and secondly because water cooling is quite impractical for the ungrounded high tension member of the electrode pair.

OBJECTS OF THE INVENTION

In view of the foregoing, it may be regarded as a major object of the present invention, to provide apparatus and method enabling electrical conversion of oxygen to ozone with electrical efficiency exceeding that previously attainable in the art.

It is a further object of the invention to provide a silent electric discharge ozone generator incorporating cooling means which are simple, capable of cooling both grounded and ungrounded electrodes, which means moreover act as a highly effective heat sink within the discharge space of said generator.

It is a further object of the invention to provide apparatus and method for ozone generation based on the silent electric discharge principle, wherein an increase in high-frequency components of the convection currents is enabled, whereby increased output of ozone ensues.

SUMMARY OF THE INVENTION

Now in accordance with the present invention, the foregoing objects, and others as will become apparent in the course of the ensuing specification, are achieved by utilizing in a silent discharge generator a fluidized particulate dielectric in the discharge zone whereat the oxygen gas is converted to ozone. In particular, apparatus in accordance with the invention, is characterized by an arrangement wherein the oxygen or oxygen-containing gas is passed upwardly through a particulate dielectric maintained between the spaced electrode surfaces of the generator, whereby a fluidized bed — consisting of suspended dielectric particles in streaming gas — is formed. The resulting bed acts not only as a highly effective heat sink for both electrodes and discharge space, but moreover, the turbulent motion of the fluidized particles produce high-frequency capacitance variations which increase the high-frequency component of the current waves, thus increasing the ozone yield.

BRIEF DESCRIPTION OF THE DRAWINGS

The invention is diagrammatically illustrated, by way of example, in the appended drawings, in which.

DESCRIPTION OF THE PREFERRED EMBODIMENTS

Figure 1:
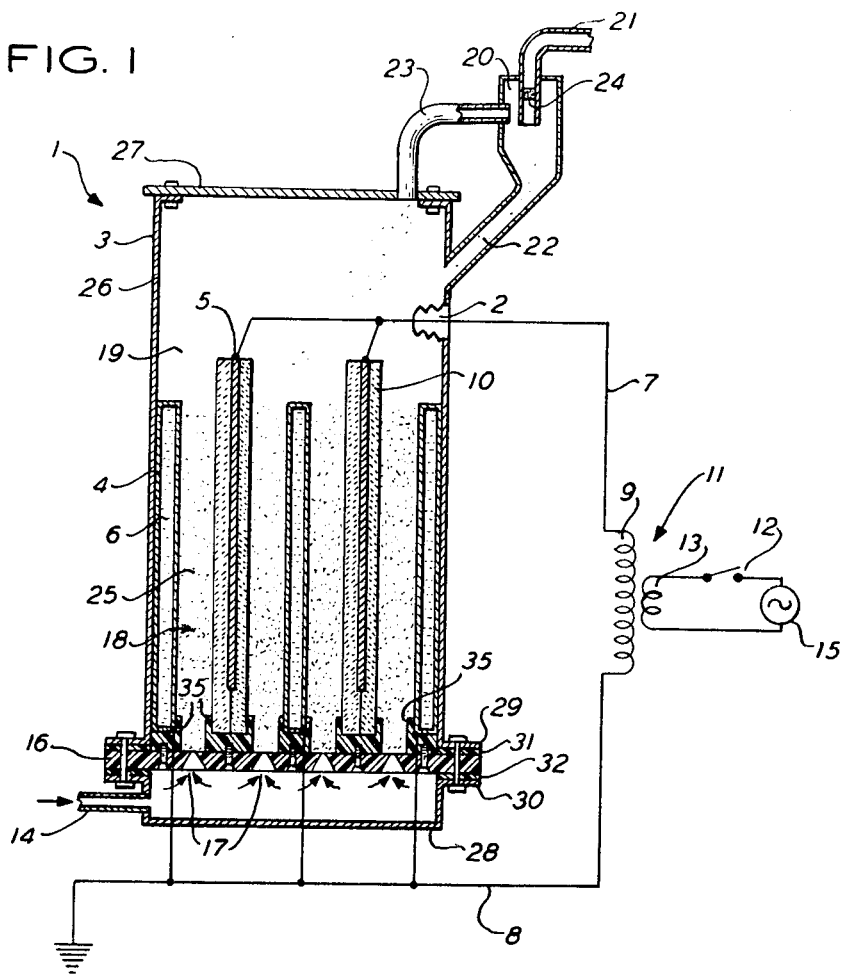
FIG. 1 is a schematic cross-section of a parallel plate, silent electrical discharge ozone generator in accordance with the invention.

In FIG. 1, a schematic cross-section is shown, of an ozone generator in accordance with the invention. The generator shown therein, generally designated by the reference numeral 1 includes an enclosure 3, in which is mounted a series of parallel plate electrodes. In order to facilitate servicing of the apparatus, enclosure 3 is actually comprised of three separable portions — a center section 26, a removable cover 27, and a bottom pan section 28. Sections 26 and 28 are bolted together with the intervening gas distribution plate 16 (which will be described subsequently) sealed between the section flanges 29 and 30 by gaskets 31 and 32. The high tension electrodes 5 are representatively shown as being two in number, but the number could of course, be expanded to enable generators of specifically desired characteristics. Electrodes 5 are connected via lead 7 to secondary 9 of high voltage transformer 11; primary 13 of transformer 11 is connected to a low voltage (110 or 220V) source of A.C. potential 15, and is also provided with switching means 12, whereby power to the ozone generator may be turned on and off. Lead 7 passes into enclosure 3 via high voltage insulator 2 mounted in the wall thereof.

High tension electrodes 5 are, in the present embodiment, covered with dielectric plates 10, typically comprising glass slabs which function — as has previously been mentioned — to distribute and render uniform the electrical discharge and thereby avoid sparking and current surges in the generator.

Spaced from high tension electrodes 5 within enclosures 3 are a series of grounded electrodes 4. The latter, representatively shown as three in number, are flat electrically conductive metallic members which are grounded through a common lead 8, which also grounds one side of transformer secondary 9. These electrodes are hollow, and cooling is provided by circulating water — via means not shown — through the cooling spaces 6 contained therein. Electrodes 4 are parallel to the opposing high tension electrodes 5, the spacing between their surfaces and the opposing dielectric faces being of the order of 1 to several millimeters.

Oxygen or an oxygen-containing gas — in the most usual case, dry air — is fed into generator 1 at input port 14. The gas typically will be fed at a regulated pressure of about 1.6 atmospheres, a value found quite effective in silent discharge generators of the present type. The incoming gas then passes through gas distribution plate 16, an insulating member formed of Teflon or similar tough plastic material. Electrodes 4 and the plates 10 surrounding electrodes 5 are secured to plate 16 through intervening spacer-gaskets 35. Rows of holes or slots 17 are present in plate 16, in such locations that the entering gas is smoothly distributed to the space 18 between electrodes, the said holes being small enough to prevent the particulate dielectric utilized in the invention from falling into the pan section 28.

Contained within enclosure 3, enveloping electrodes 4 and 5, and most specifically occupying the space 18 between electrodes, is a particulate dielectric 19. Particulate dielectric 19 typically will comprise fluidizable granular, highly electrically insulating material such as sand (e.g., Ottawa sand), glass powders, powdered highly insulating plastics or the like. The dielectric material must be chemically resistant to the action of oxygen and ozone and must not of course be a fire hazard under operating conditions. As the dielectric 19 will form the suspended phase of a fluidized bed contained within space 18, it is clear that the particle sizes and size distribution thereof will preferably be chosen as to be appropriate to the electrode spacing, the gas flow rates, etc. Typically the spacing between electrodes 4 and 5 in a parallel plate type of arrangement, such as that of the Figure, is of the order of from about 1 to about 5 millimeters, preferably spacing being toward the middle of this range, with gas flow rates being of the order of 1 to 3 ft./second; and under such conditions good results will be yielded when particle sizes in the dielectric are in the several hundred or below micron range with the preferable size range of the particles being of the order of 100 to 300 microns. In order to yield good uniformity in heat sink characteristics of the bed, it is also preferable to have a fairly narrow distribution in size characteristics; however, this factor is not critical to practice of the invention.

Under the influence of the streaming gases passing through plate 16 and into space 18, particulate dielectric 19 is driven against the counteracting forces of gravity, to yield, under proper gas flow rates, a fluidized dielectric bed 25 in the spaces 18.

The fluidization of solids in this manner is, of course, well known. In particular it is known that when a fluid, usually a gas, is passed upwardly through a mass of solid particles at a velocity sufficient to support the particles, the flow velocity may be so adjusted that the entire mass of particles is agitated without yet entraining sizable numbers of the particles in the streaming gas so as to remove them from the bed. This phenomenon is known as dense phase fluidization and the mass of suspended particles are referred to as a fluidized bed. Such a fluidized bed exhibits many of the characteristics of a liquid, such as mobility and hydrostatic pressure.

In operation of generator 1, the input gas is ported into the apparatus to establish the fluidized bed 25, after which switch 12 is turned on to activate the high gradient electric field in spaces 18. As a result a silent electrical discharge is established in spaces 18 and conversion of the streaming oxygen to ozone in such spaces is initiated. The converted gases leave the apparatus by port 23 and then enter a separator 20, which may be of the simple design shown in the Figure or of the centrifugal or cyclonic variety. At separator 20 such dielectric particles as have become entrained in the ozone-bearing gases, are separated, and returned to enclosure 3 by duct 22. The ozone and unreacted gases leave separator 20 via outlet 21, passing through the filter 24 which prevents possible passage of particulate matter. In spite of the separating and filtering processes cited, the particulate dielectric will in time become degraded, necessitating a periodic replenishment of the particles. This, however, is easily accomplished by merely removing cover 27 and adding the required additional material.

In accordance with the invention, the presence of fluidized bed 25 in spaces 18 acts as an extremely effective heat sink for electrodes 4 and 5, and serves as well to rapidly dissipate heat of reaction in the discharge zones of spaces 18, proper. Here it should be appreciated that the very essence of a fluidized bed — which is to say here the turbulent agitation of the dielectric particles — is responsible for the excellent heat sink properties of the bed. In particular, localized hot zones in the discharge space are rapidly dissipated by the continuous turbulent motion of particles in and through the said zones. The net result of this great increase in cooling efficiency is a reduction in temperature in the reaction zones between electrodes, with a consequent increase in electrical efficiency of the apparatus.

While the configuration of the generator 1 includes the customary discharge-spreading dielectric plates 10, the concept of the present invention makes possible elimination of these elements under suitable electrical and flow conditions. In particular, the electrical function of plates 10 can be displaced by the dense phase fluidized bed itself. Elimination of plates 10 not only simplifies the apparatus and reduces the cost thereof, but moreover improves the cooling characteristics of the system by directly exposing the high tension electrodes 5 to the coolant.

The turbulent motion of the myriad dielectric particles of the fluidized bed has another most important consequence. As has been previously commented upon, ozone production in silent electrical discharge generators has been shown to be proportional to the high-frequency components of the current. In the present invention, the turbulent motion of the fluidized particles produces high-frequency capacitance variations between bounding electrodes, as a result of which an increase occurs in the high-frequency component of the current waves. In consequence, increased ozone productivity is enabled.

Figure 2:
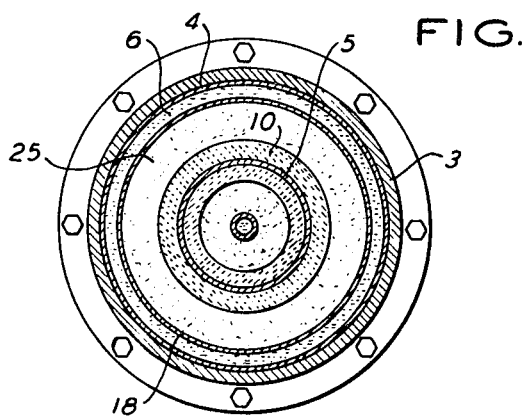
FIG. 2 is an end cross-sectional view of an embodiment of the invention utilizing cylindrical geometry for the electrodes and intervening discharge space.

FIG. 2 is an end cross-sectional view of an embodiment of the invention utilizing cylindrical geometry for the electrodes and intervening discharge space. The operation of this embodiment is essentially identical to the FIG. 1 device, and conditions of operation such as electrode spacing, potentials thereacross, gas flow rates, as well as constituency of the particulate of electric, are to be regarded as unchanged. Functionally corresponding parts, such as electrode surfaces, are identified by corresponding reference numerals; for example, the discharge space between electrodes — now annular in form — is identified at 18, the fluidized bed formed therein being designated at 25. The present variation is merely intended to illustrate that the fluidized bed principle, as applied to ozone generators of the silent discharge type, is quite general in nature, is as applicable to tubular generators as the flat-plate variety of generator, and for that matter may be effectively employed in any geometry permitting establishment of the fluidized bed in the generator discharge space.

While the present invention has been particularly described in terms of specific embodiments thereof, it will be evident in view of the disclosure, that numerous variations upon the invention are now enabled to those skilled in the art, which variations are yet within the true teaching of the invention. Accordingly, the invention should be broadly construed, and limited only by the scope and spirit of the claims now appended hereto.

We claim:

1. A method for high yield conversion of oxygen to ozone comprising: passing an oxygen-containing gas through a contained particulate dielectric whereby to form a fluidized bed defined by the suspension of said dielectric particles in said streaming gas, while maintaining across said fluidized bed a silent electrical discharge.

2. A method according to claim 1 wherein said discharge is maintained by an A.C. electric field established across said fluidized bed.

3. A method according to claim 1 further including continuously collecting the gases exuding from said bed, separating the dielectric particles entrained in said gases, and returning said separated particles to said bed.

4. A method according to claim 1 wherein the particles of said dielectric are in the size range of from about 100 to about 300 microns, and are contained between two surfaces substantially uniformly spaced from one another a distance of from about 1 to about 5 millimeters, the gas velocity between said surfaces being from about 1 to about 3 feet per second.

* * * * *